United States Patent [19]
Horie

[11] Patent Number: 5,486,819
[45] Date of Patent: Jan. 23, 1996

[54] ROAD OBSTACLE MONITORING DEVICE

[75] Inventor: Ryuji Horie, Yokohama, Japan

[73] Assignee: Matsushita Electric Industrial Co., Ltd., Osaka, Japan

[21] Appl. No.: 447,083

[22] Filed: May 22, 1995

Related U.S. Application Data

[63] Continuation of Ser. No. 787,952, Nov. 5, 1991, abandoned.

[30] Foreign Application Priority Data

Nov. 27, 1990 [JP] Japan ..................... 2-328665

[51] Int. Cl.$^6$ .............. G08G 1/09; H04N 7/18
[52] U.S. Cl. ............ 340/905; 340/901; 340/937; 348/148; 348/149
[58] Field of Search ................ 340/903, 905, 340/435, 436, 937, 901; 348/143, 148, 149, 162, 164; 382/1

[56] References Cited

U.S. PATENT DOCUMENTS

| | | | |
|---|---|---|---|
| 4,257,063 | 3/1981 | Loughry et al. | 358/105 |
| 4,578,665 | 3/1986 | Yang | 358/108 |
| 4,872,051 | 10/1989 | Dye | 340/436 |
| 5,115,398 | 5/1992 | De Jong | 358/103 |

*Primary Examiner*—Donnie L. Crosland
*Attorney, Agent, or Firm*—Popham, Haik, Schnobrich & Kaufman, Ltd.

[57] ABSTRACT

A road obstacle monitoring device is disclosed, in which a monitoring imaging section monitors and images a road section, where road obstacles by wave flooding, land slip, etc. are foreseen, to output image signals; the image signals thus generated are data-processed by an image processing section so that component data corresponding to the road obstacles are extracted; and the component data corresponding to the road obstacles thus extracted are measured by a measuring recognizing section for measuring the component data corresponding to the road obstacles thus extracted so that it is detected from a result of measurements whether there exist the road obstacles or not and a result of recognition thus obtained is displayed for warning so as to inform passengers, drivers of vehicles, etc. passing therethrough of the road obstacles by wave flooding, land slip, etc. in the road section to be monitored.

12 Claims, 6 Drawing Sheets

ROAD OBSTACLE MONITORING DEVICE

This is a continuation of U.S. patent application Ser. No. 07/787,952, filed Nov. 5, 1991, now abandoned.

BACKGROUND OF THE INVENTION

The present invention relates to a road obstacle monitoring device and more in detail to a road obstacle monitoring device, in which road obstacles such as wave flooding, land slip, etc. are detected by means of a monitoring TV camera; detected image signals are subjected to image processing and it is judged whether there are road obstacles or not; and if there are road obstacles, a warning signal is outputted immediately in order to be able to take measures at sites against the road obstacles and to give warning to drivers of passing vehicles, etc.

Heretofore, occurrence of this kind of road obstacles is verified often by a monitoring patrol by monitors or by information by passengers, drivers of passing vehicles, etc., who are going to pass through a place of the occurrence, after the road obstacles have really occurred. On the other hand, depending on the location of the road, suitable detecting sensors are set before hand to verify the road obstacles by measuring outputs from the detecting sensors.

Consequently, by the prior art means for detecting the road obstacles as described above, in the case where the road obstacles take place, they cannot be verified, until a monitor goes to the place of occurrence for the monitoring or an informer informs him of the occurrence of the road obstacles, which causes delay of judgment to be done for securing the safety for the traffic. Further, depending on the kind of detecting sensors, there is an undesirable problem that an extremely large number of detecting sensors are required for effecting measurements and detections of unspecified road locations and extents of road obstacles.

SUMMARY OF THE INVENTION

The present invention has been done in order to solve such a problem of the prior art technique and the object thereof is to provide this kind of road obstacle monitoring devices using an imaging device for monitoring a road section, where occurrence of obstacles is foreseen, and an image processing device for processing image signals thus generated as previously determined in order to be able to measure and detect automatically obstacles in a sufficiently wide monitoring area with respect to an individual detecting sensor so as to take measures at sites at a point of time where the road obstacles take place and to effect rapidly danger announcement by means of warning boards, etc. for passengers passing through a location, where the obstacles have taken place, and drivers of vehicles on the route there.

In order to achieve the above object, a road obstacle monitoring device is characterized in that it comprises a monitoring imaging section for monitoring and imaging a road section, where road obstacles by wave flooding, land slip, etc. are foreseen; an image processing section for image-processing image signals generated by the monitoring imaging section to extract component data corresponding to the road obstacles; a measuring recognizing section for measuring the component data corresponding to the road obstacles thus extracted to detect the road obstacles from a results of measurements; and a warning displaying section for displaying a result of recognition obtained by the measuring recognizing section.

Consequently, owing to the construction as described above, a road obstacle monitoring device according to the present invention, has following operations.

That is, a monitoring imaging section monitors and images a road section, where road obstacles by wave flooding, land slip, etc. are foreseen, to output image signals; the image signals thus generated are data-processed by an image processing section so that component data corresponding to the road obstacles are extracted; and the component data corresponding to the road obstacles thus extracted are measured by a measuring recognizing section for measuring the component data corresponding to the road obstacles thus extracted so that it is detected from a result of measurements whether there exist the road obstacles or not and a result of recognition thus obtained is displayed for warning. In this way, it is possible to inform passengers, drivers of vehicles, etc. passing therethrough of the road obstacles by wave flooding, land slip, etc. in the road section to be monitored.

DESCRIPTION OF THE PREFERRED EMBODIMENTS

Figure 1:
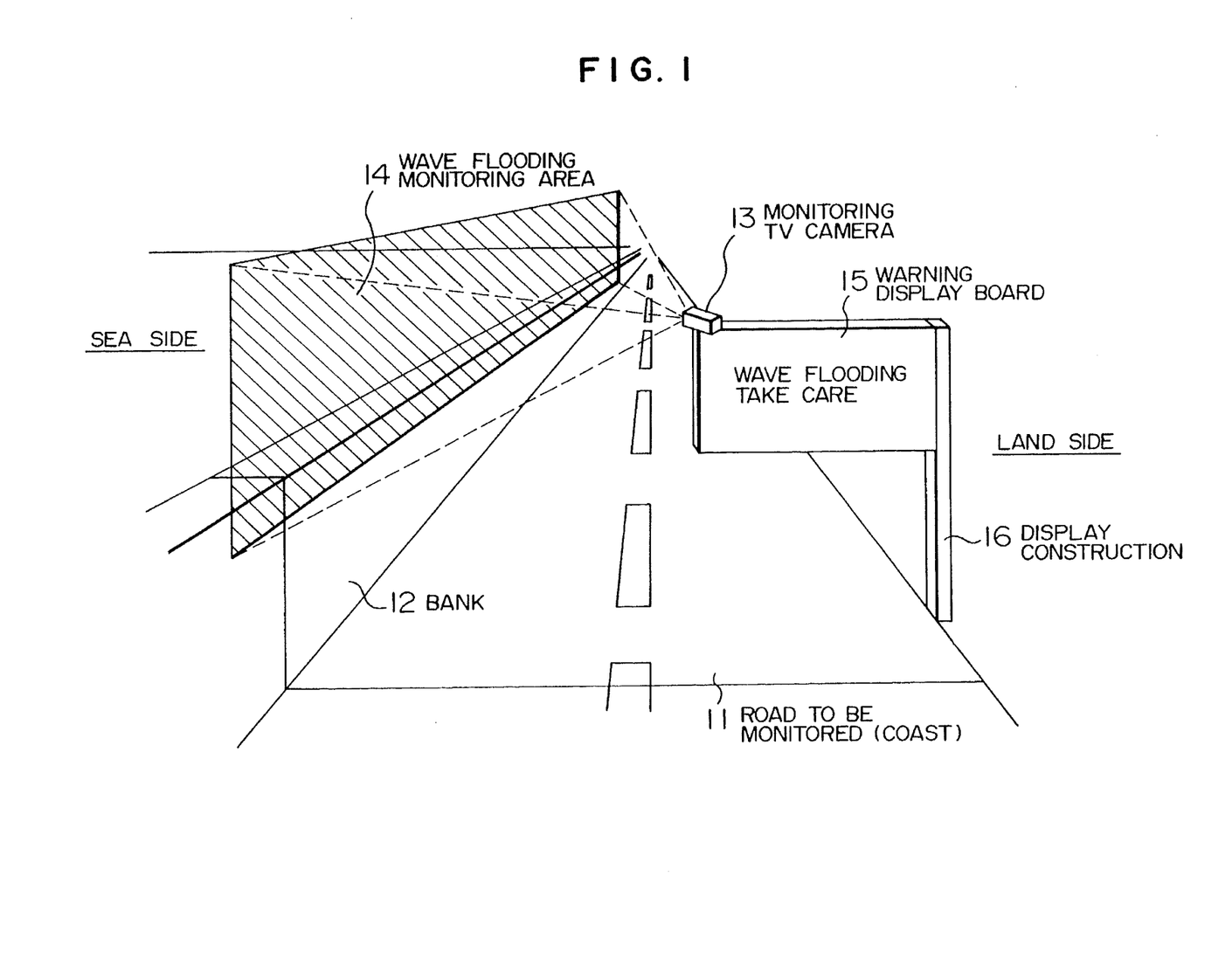
FIG. 1 is a scheme for explaining a situation, which is a first application example, in which a road obstacle monitoring device according to the present invention is applied to a road along a coast, where occurrence of road obstacles by wave flooding can be foreseen.

FIG. 1 is a scheme for explaining the first application example of the present invention. Here it shows schematically a situation, in which a road obstacle monitoring device is set, as an application example, in the case where occurrence of road obstacles by wave flooding can be foreseen in a road along a coast.

In the construction of the first application example indicated in FIG. 1, a road to be monitored 11 is constructed along a coast; a bank 12 is constructed on the sea side of the road to be monitored 11; an imaging device here a monitoring TV camera 13, is secured on a display construction 16 constructed on a shoulder portion, etc. of the road to be monitored 11 described above, projecting upward from the road to monitor and image a wave flooding area 14 having an extent of a certain height over a certain distance, including the upper part of the bank 12 described above, without interruption; and a warning display device, here a warning display board 15, is disposed on a display surface of the display construction 16 described above and displays a warning against the occurrence of road obstacles by wave flooding to inform drivers of vehicles; etc. passing therethrough of danger.

Figure 2:
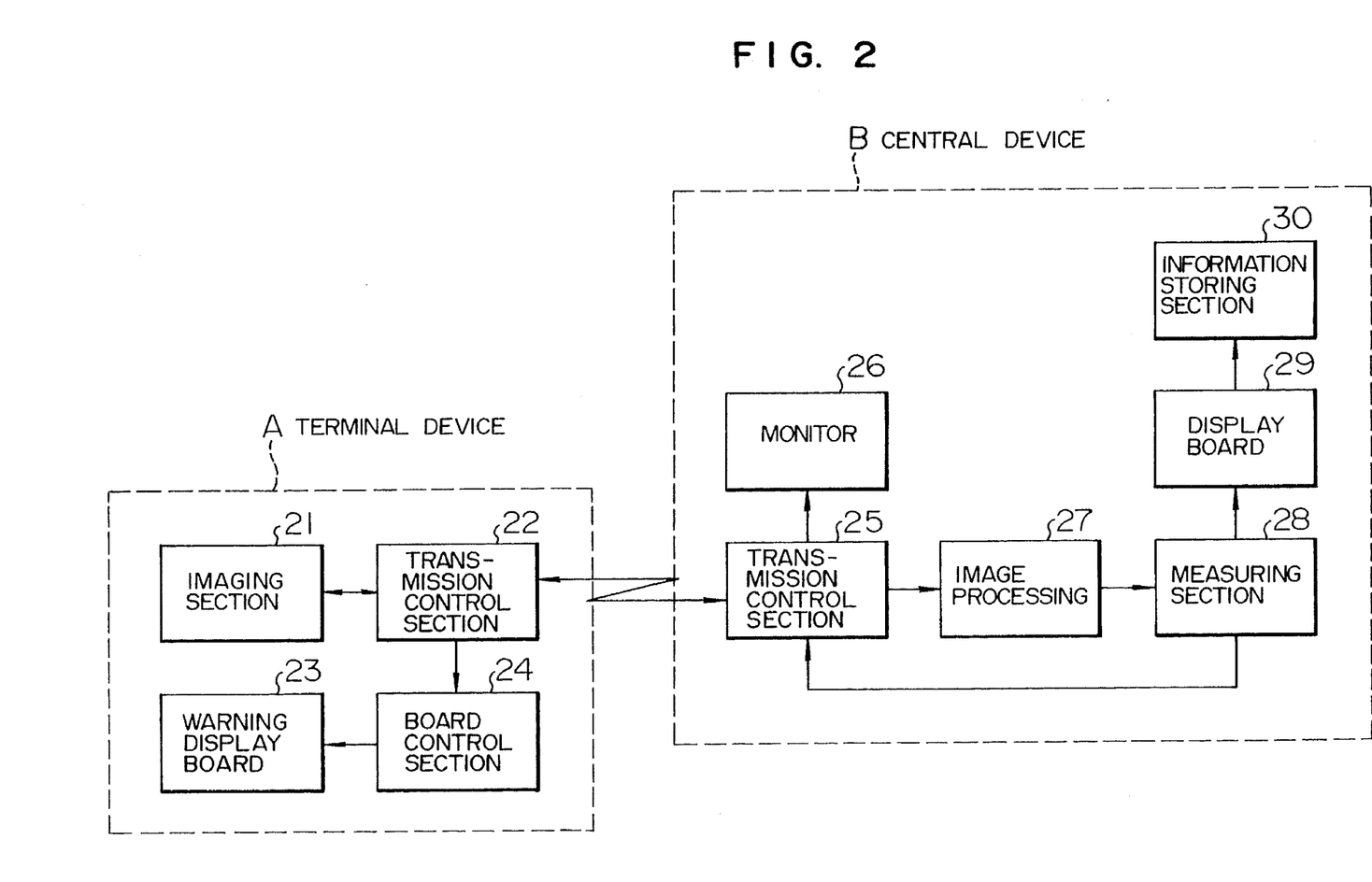
FIG. 2 is a block diagram showing the outline of the construction of the road obstacle monitoring device according to a first embodiment of the present invention.

Next, FIG. 2 is a block diagram showing the outline of the construction of the road obstacle monitoring device according to an embodiment of the present invention. The device used in this embodiment is composed roughly of a terminal device A consisting of a monitoring TV camera 13 and the warning display board 15 and a central device B processing image data generated on the terminal device A side. These devices A and B are connected appropriately, e.g. through a communication line, etc.

In the terminal device A having the construction indicated in FIG. 2, an imaging section 21 corresponds to the monitoring TV camera 13; a transmission control section 22 controls data transmission and reception on the terminal device A side; a warning display board section 23 corresponds to the warning display board 15 described above; and a board control section 24 controls the display on the warning display board section 23. On the other hand, in the central device B, a transmission control section 25 controls data transmission and reception on the central device B side; a monitor section 26 for monitoring displays image data from the terminal device A described above; an image processing section 27 processes the image data after having A/D-converted them; a measuring section 28 measures the road obstacles, here obstacles by wave flooding, by using a result of the processing described above to recognize them; a display board 29 displays a result of recognition thus obtained; and an information storing section 30 stores information on the result of recognition.

Figure 3:
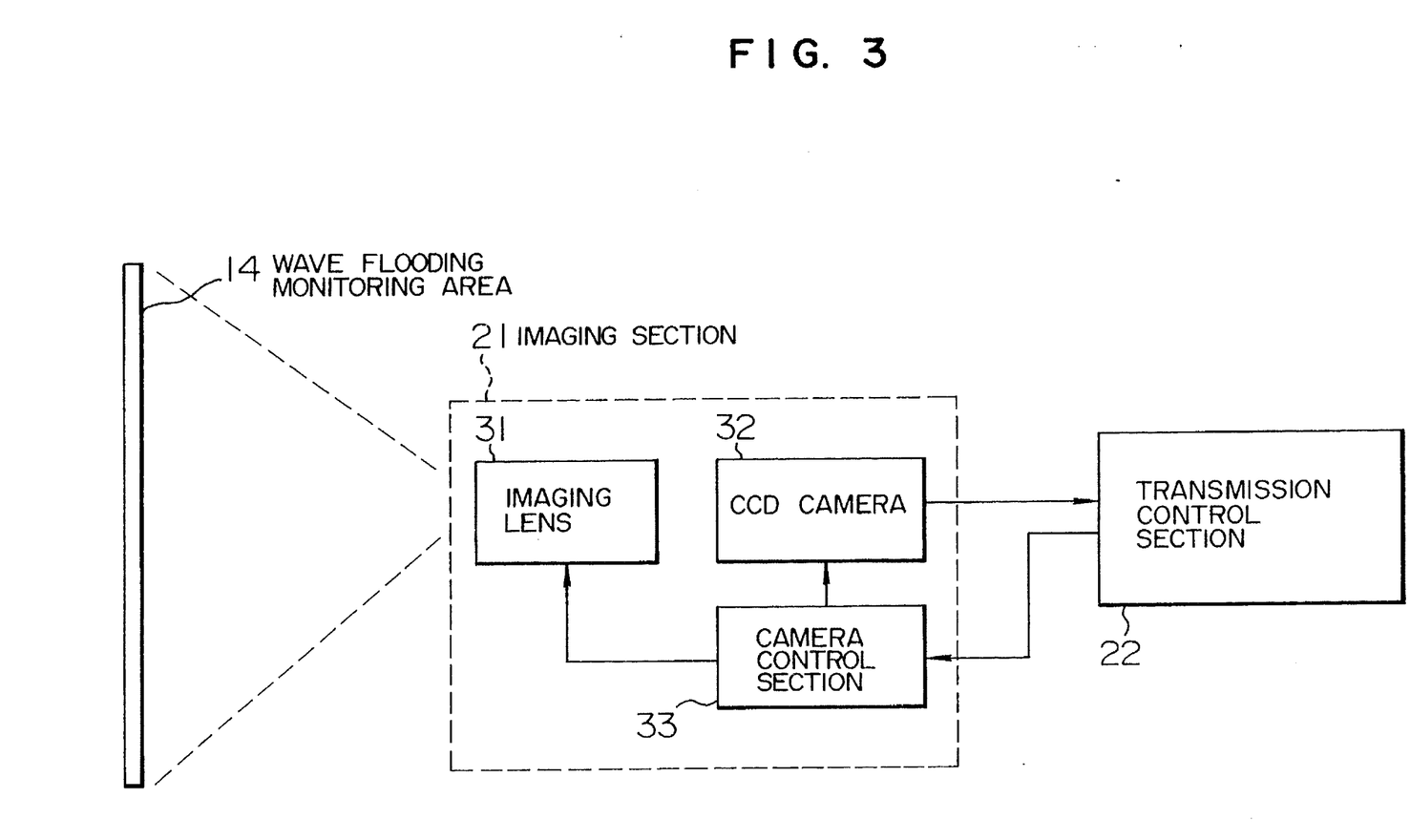
FIG. 3 is a block diagram showing an imaging section in detail, which corresponds to a monitoring TV camera used in the embodiment described above.

FIG. 3 is a block diagram showing the imaging section 21 corresponding to the monitoring TV camera 13 described above in detail.

In the construction of this imaging section 21 indicated in FIG. 3, an imaging lens 31 has an auto iris focusing function and 32 represents a so-called CCD camera, these imaging lens 31 and the CCD camera 32 constituting the monitoring TV camera 13. The control of the iris focusing function of the imaging lens 13 and the control of the electronic shutter function of the CCD camera 32 are effected simultaneously by the camera control section 33 on the basis of control signals from the central device B described above. These controls in the imaging section 21 are effected in order to obtain images always with a suitable contrast, corresponding to variations in the brightness, in the day time and in the night, in the open air.

Figure 4:
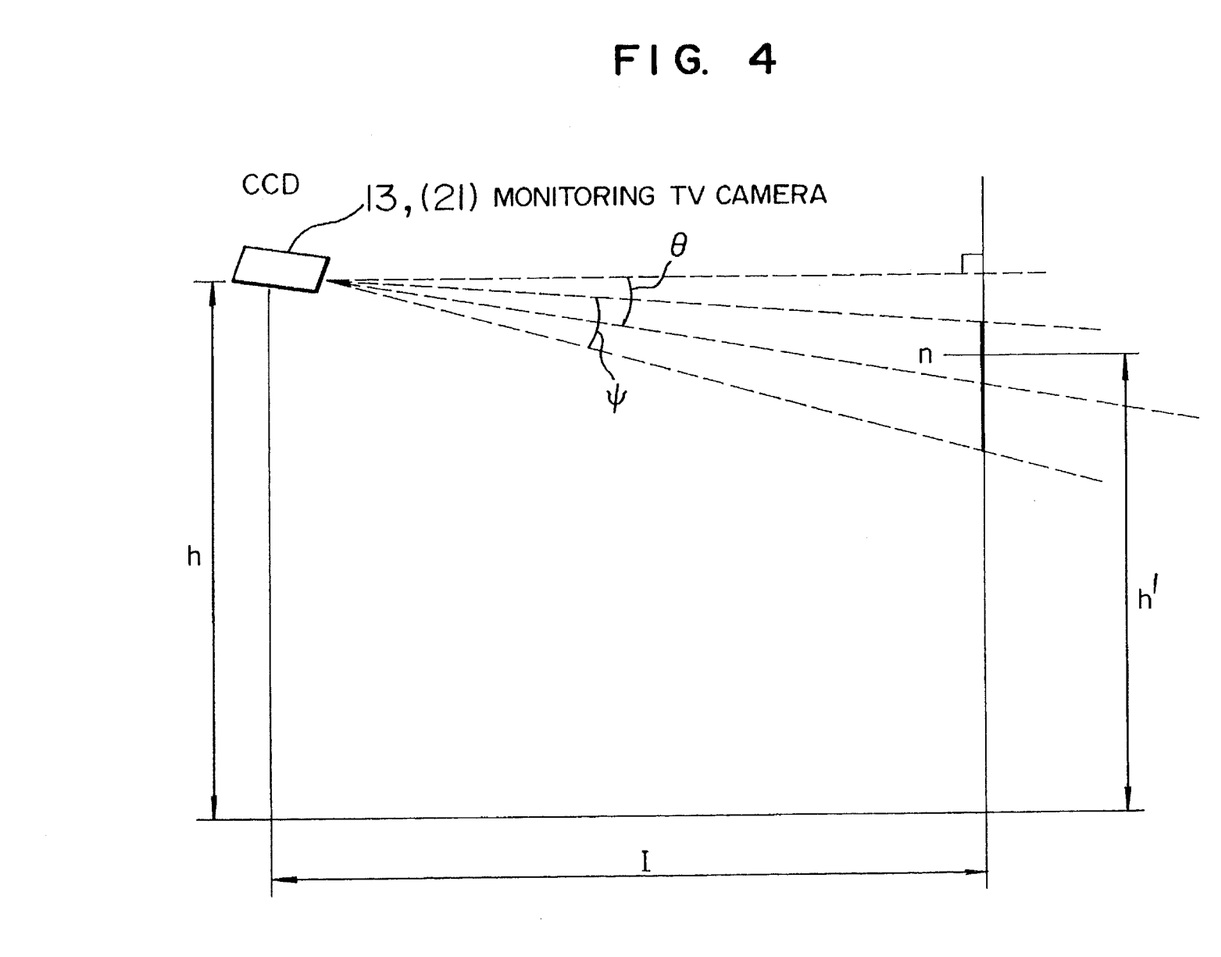
FIG. 4 is a conceptual scheme for explaining a method for measuring wave height by means of the device used in the embodiment.

Further, FIG. 4 is a conceptual scheme for explaining a method for measuring the height of waves getting-over the bank 12 by means of the device used in a first application example, in which h represents the setting height of the monitoring TV camera 13; l the distance from the TV camera 13 to the bank 12; θ the inclination of the monitoring TV camera 13 from the horizontal plane; φ the angle of visual field in the vertical direction of the above TV camera 13; and n the vertical position of a pixel corresponding to the summit of a wave flooding, imaged by the monitoring TV camera 13, h' indicating the greatest height of the wave.

Next, the operation of the device of the embodiment having the construction used in the first application example described above will be explained.

In the construction of the device in this embodiment, as indicated in FIG. 1, the monitoring TV camera 13 on the terminal device A side is set previously in a region, where wave flooding waves are foreseen. The wave flooding monitoring area 14 on the road to be monitored 11 are monitored always and at the same time image data obtained by means of the TV camera 13 for monitoring wave flooding are transmitted from the transmission control section 22 to the transmission control section 25 on the central device B side, where the image data in the wave flooding monitoring area 14 transmitted to the central device B side are data-processed at first by the image processing section 27 so that only component data representing the wave flooding are extracted. Subsequently, in the measuring section 28, the vertical position of the pixel corresponding to the summit of a wave flooding, indicated in FIG. 4 is obtained from the extracted component data representing the wave flooding.

As clearly seen from FIG. 4, the real greatest height of wave h' can be easily calculated by using a following formula;

$$h' = h - l \cdot \tan\left\{ \frac{\phi}{N} n + \left(\theta - \frac{\phi}{2}\right) \right\},$$

where N represents the number of pixels in the vertical direction in the used CCD camera 32.

In the case where the greatest wave height h thus calculated exceeds a dangerous level, a warning signal from the measuring section 28 is transmitted to the transmission control section 22 on the terminal device A side through the transmission control section 25. On the terminal device A side, which has received the warning signal, it is led to the warning display board section 23 through the board control section 24 and finally a warning display is effected on the warning display board 15 in order to give drivers of vehicles, etc. passing through the road to be monitored 11 a warning that there are road obstacles by wave flooding.

Further, even if dangerous wave heights appear only discontinuously in the obtained image data, it is desirable to hold continuously the display of the warning against wave flooding for a predetermined setting time so as to warn passengers of the danger.

Figure 5:
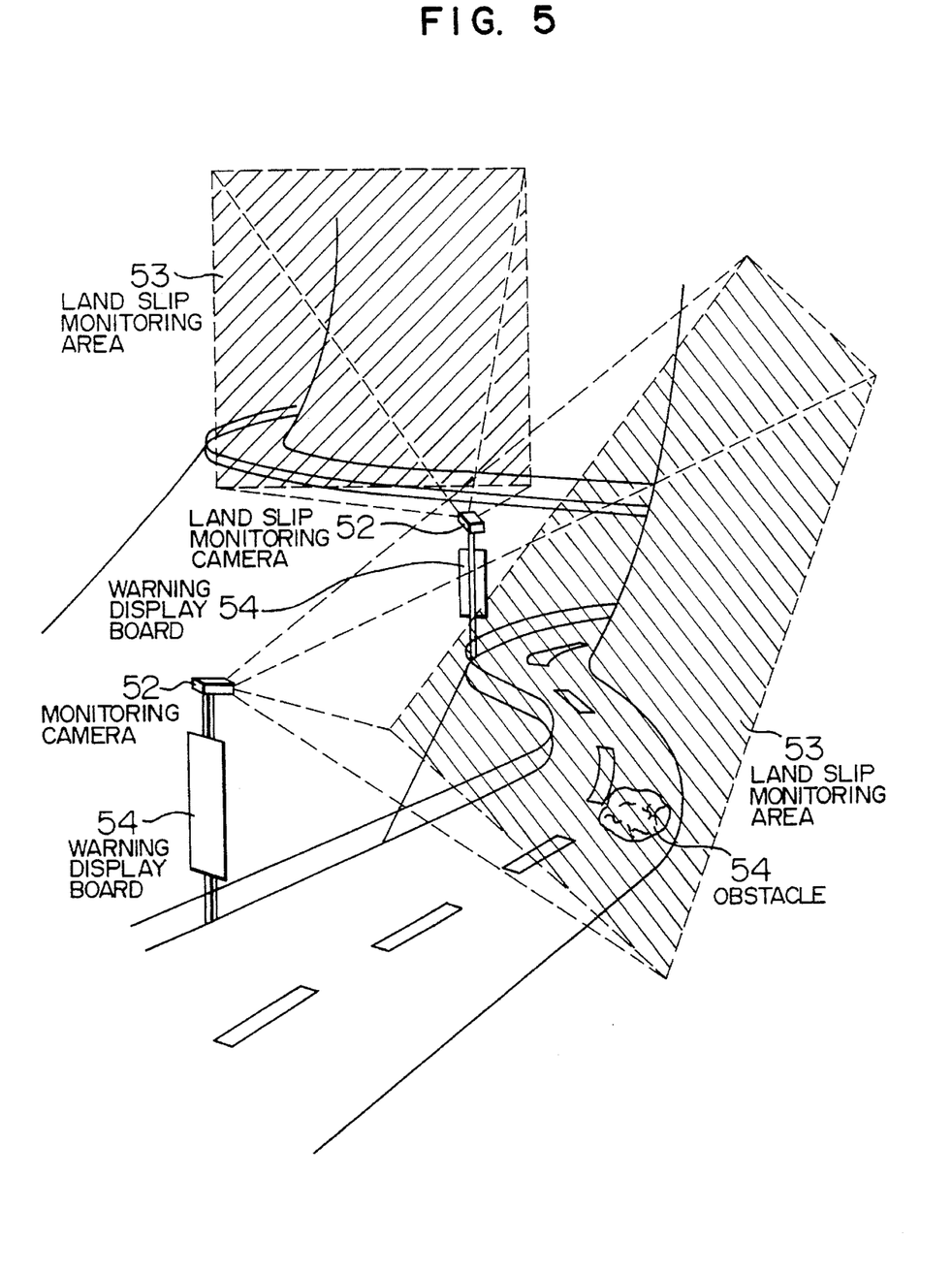
FIG. 5 is a scheme for explaining a situation, which is a second application example, in which a road obstacle monitoring device according to the present invention is applied to a road constructed at a place between mountains, surrounding a mountain, where occurrence of road obstacles by land slip can be foreseen.

Next, FIG. 5 is a scheme for explaining a situation, which is a second application example, in which a road obstacle monitoring device according to the present invention is applied to a road constructed at a place between mountains, surrounding a mountain, where occurrence of road obstacles by land slip can be foreseen.

In the construction of the second application example indicated in FIG. 5, a road to be monitored 51 is constructed so as to surround a mountain; a monitoring TV camera 52 images without interruption a fall monitoring area 53 having an extent of a certain height over a certain distance, where land slip can be foreseen on the road to be monitored 51; and a warning display board 54 displays a warning against the occurrence of road obstacles by land slip to inform drivers of vehicles, etc. passing therethrough of danger. Further, 55 in the figure represents an obstacle, which has slipped on the road to be monitored 51.

Here, also in this second application example, the detail of each part of the device is constructed approximately similarly to the case of the first application example described previously.

In the construction of the device in this embodiment, as indicated in FIG. 5, the monitoring TV camera 52 is set previously in a region, where land slip is foreseen. The fall monitoring area 53 on the road to be monitored 51 are monitored always and at the same time image data obtained by means of the TV camera 52 for monitoring land slip are transmitted from the transmission control section 22 to the transmission control section 25 on the central device B side, where the image data in the fall monitoring area 53 transmitted to the central device B side are frame-difference-processed at first by the image processing section 27 after having been A/D converted, so that only component data representing a body on the road to be monitored 51, i.e. in this case body corresponding the obstacle 55, which has fallen, are extracted. Thereafter, in the case where there are no variations in the extracted component data representing the body and in particular in the case where there are no moving variations, when several frames with an interval of a predetermined time are processed in a similar way, the measuring section 28 judges that this is an obstacle 55 and transmits a warning signal from the transmission control section 25 to the transmission control section 22 on the terminal device A side. On the terminal device A side, which has received the warning signal, it is led to the warning display board section 23 through the board control section 24 and finally a warning display is effected on the warning display board 54 in order to give drivers of vehicles, etc. passing through the road to be monitored 51 a warning that there are road obstacles by land slip.

Figure 6:
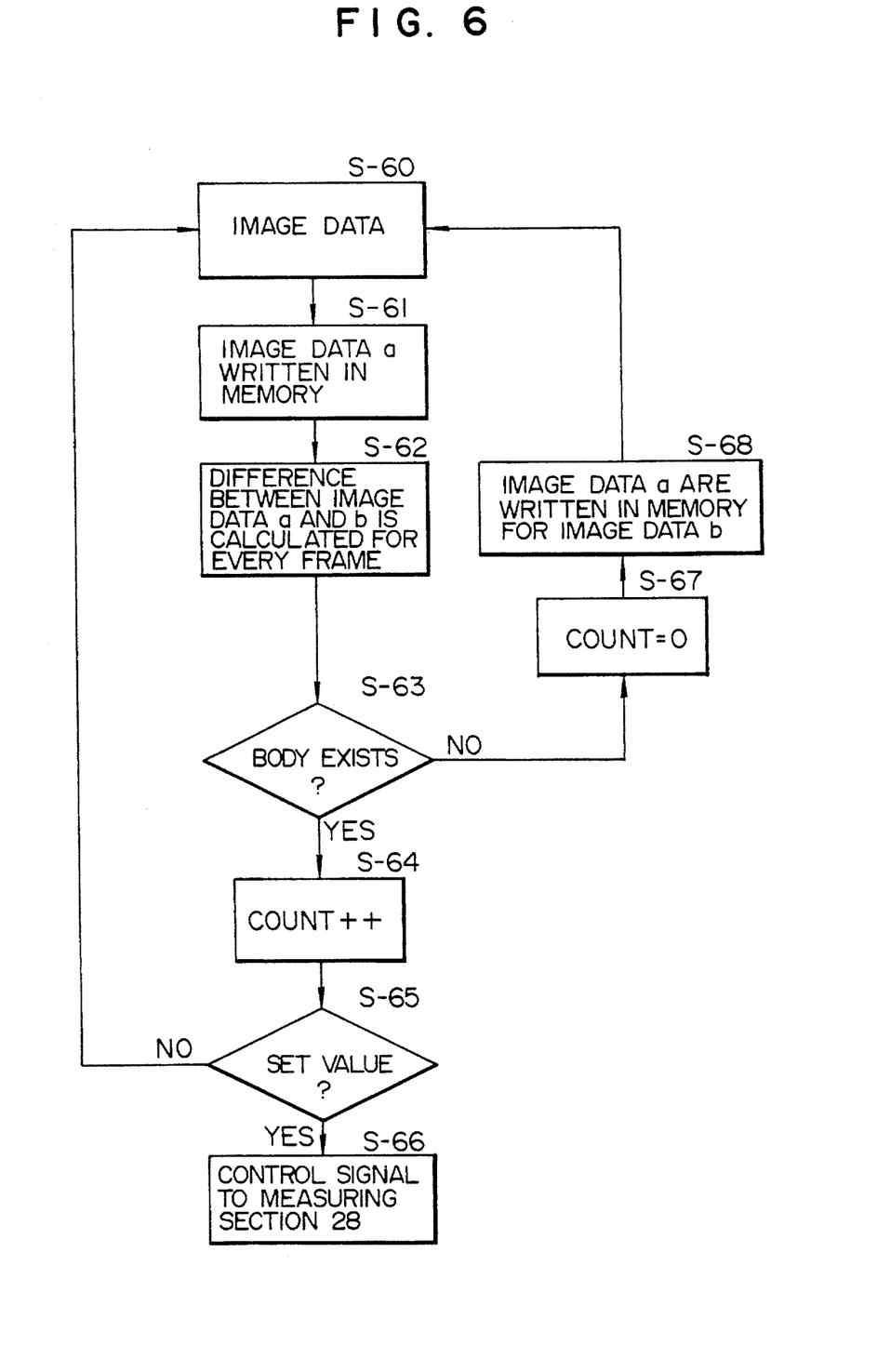
FIG. 6 is a flow chart for explaining a method for measuring obstacles, which have slipped on a road to be monitored in the application example described above.

FIG. 6 is a flow chart for explaining a method for measuring the obstacles 55, which have slipped on the road to be monitored 51, by the device in the second application example.

That is, in this FIG. 6, the image data in the fall monitoring area 53 imaged by the fall monitoring TV camera 52 (Step S-60) are written in a memory as image data a for every frame in the image processing section 27 (Step S-61). Here, at the same time, the difference between the image data a written for every frame and the image data b preceding them by 1 frame is obtained by a calculation processing (Step S-62). The body on the road to be monitored 51 is detected by a result thus obtained (Step S-63).

When the body on the road to be monitored 51 is detected in this way, the number of repetitions thereof is counted (Step S-64). If the count value doesn't reach a predetermined value set for the number of repetitions, the image data b are held as they are (Step S-65). The image data a are up-dated and the differential calculation is repeatedly effected. In the case where the body on the road to be monitored 51 is continuously detected, also when it is repeated a predetermined number of times, it is judged that the body is an obstacle 55 and a control signal representing it is transmitted to the measuring section 28 (Step S-66). Thereafter, the measuring section 28 measures the size of the obstacle 55 and judges whether it is dangerous or not. If necessary, it outputs a warning signal.

On the contrary, in the case where no body is detected on the road to be monitored 51 at the point of time of Step S-63 described above, the counter for the number of repetitions is set at "0" (Step S-67). Then the image data a is rewritten in the memory for the image data b (Step S-68) and thereafter imaging is effected again (Step S-60). The memory for the image data a is up-dated and the differential calculation is effected.

Further, although in the construction of embodiment in each of the application examples, the monitoring TV camera in the monitoring and imaging section and the warning display board in the warning display section are located in a state where they are arranged closely to each other, contrarily to the fact that the setting position for the former, i.e. monitoring TV camera, is restricted for monitoring and imaging always a predetermined extent to be monitored, it is not necessary to restrict the setting position for the latter, i.e. warning display board, but it may be located before road obstacles considerably distant therefrom.

As clearly seen from the construction of embodiment in each of the application examples, since a road obstacle monitoring device comprises a monitoring image section for monitoring and imaging a road section, where road obstacles by wave flooding, land slip, etc. are foreseen; an image processing section for image-processing image signals generated by the monitoring imaging section to extract component data corresponding to the road obstacles; a measuring recognizing section for measuring the component data corresponding to the road obstacles thus extracted to detect the road obstacles from a result of measurements; and a warning displaying section for displaying a result of recognition obtained by said measuring recognizing section, it is possible that a monitoring imaging section monitors and images a road section, where road obstacles by wave flooding, land slip, etc. are foreseen, to output image signals; the image signals thus generated are data-processed by an image processing section so that component data corresponding to the road obstacles are extracted; and the component data corresponding to the road obstacles thus extracted are measured by a measuring recognizing section for measuring the component data corresponding to the road obstacles thus extracted so that it is detected from a result of measurements whether there exist the road obstacles or not and a result of recognition thus obtained is displayed for warning so as to inform passengers, drivers of vehicles, etc. passing therethrough of the road obstacles by wave flooding, land slip, etc. in the road section to be monitored. As the result, an effect can be obtained that it is possible to inform beforehand passengers, drivers of vehicles, etc. passing therethrough of the road obstacles such as wave flooding, land slip, etc. on the road to be monitored to avoid efficiently dangers at passage accompanied by the road obstacles in order to secure satisfactorily the safety for the traffic.

I claim:

1. A system for monitoring selected road sections and for detecting the occurrence of obstacles that occupy said selected road sections, said system comprising:

a road section imaging device for generating image data of a selected road section being monitored, said image data including reference image data of said selected road section having no obstacles and monitored image data of said selected road section when obstacles may be present;

an image processing device communicatively connected to receive said image data from said road section imaging device, said image processing device including means for detecting an obstacle based on detecting a frame difference between said reference image data and monitored image data;

means connected to said image processing device, for measuring physical dimensions of said detected obstacle and for generating an output signal when said physical dimensions of said obstacle exceed predetermined minimum physical dimension data; and means communicatively connected to receive said output signal from said measuring means, for generating a warning display of said detected obstacle.

2. The system of claim 1, wherein said obstacle detecting means of said image processing device is further for extracting image component data of said obstacle based on said frame difference between said reference image data and monitored image data.

3. The system of claim 1, wherein said image processing device includes means for verifying the presence of said obstacle in said selected road section based on a predetermined number of repetitions of detecting a frame difference between said reference image data and said monitored image data.

4. The system of claim 1, wherein said means for measuring physical dimensions of said detected obstacle is further for measuring a height of said obstacle and for generating said output signal when said height of said obstacle exceeds a predetermined minimum height.

5. The system of claim 4, wherein said obstacle being detected is a flood wave.

6. The system of claim 1, wherein said means for measuring physical dimensions of said detected obstacle is further for measuring a size of said obstacle and for generating said output signal when said size of said obstacle exceeds a predetermined minimum size.

7. A remote system for monitoring selected road sections and for detecting the occurrence of obstacles that occupy said selected road sections, said system comprising:

a remote terminal device located to monitor a selected road section, said terminal device including
   a road section imaging means for generating image data on a selected road section being monitored, said image data including reference image data of said selected road section having no obstacles and monitored image data of said selected road section when obstacles may be present,
   first communication means for transmitting signals of said image data, and
   means for generating a warning display of an obstacle detected in said selected road section; and a central monitor device including
   second communication means for receiving said signals of said image data,
   an image processing means connected to said second communication means, for detecting an obstacle based on image processing a frame difference between said reference image data and said monitored image data, and
   means connected to said image processing means, for measuring physical dimensions of said detected obstacle and for generating an output signal when said physical dimensions of said obstacle exceed predetermined minimum physical dimension data, wherein
   said second communication means is further for transmitting said output signal from said measuring means to said first communication means, and said warning display means generates a warning display of said detected obstacle based on said output signal received by said first communication means.

8. The remote system of claim 7, wherein said image processing means of said image processing device is further for extracting image component data of said obstacle based on said frame difference between said reference image data and monitored image data.

9. The remote system of claim 7, wherein said image processing means is further for verifying a presence of said obstacle in said selected road section based on a predetermined number of repetitions of detecting a frame difference between said reference image data and monitored image data.

10. The remote system of claim 7, wherein said means for measuring physical dimensions of said detected obstacle is further for measuring a height of said obstacle and for generating said output signal when said height of said obstacle exceeds a predetermined minimum height.

11. The remote system of claim 10, wherein said detected obstacle being detected is a flood wave.

12. The remote system of claim 7, wherein said means for measuring physical dimensions of said detected obstacle is further for measuring a size of said obstacle and for generating said output signal when said size of said obstacle exceeds a predetermined minimum size.

* * * * *